(12) United States Patent
Bose et al.

(10) Patent No.: US 7,983,799 B2
(45) Date of Patent: Jul. 19, 2011

(54) SYSTEM AND METHOD FOR CONTROLLING MICROGRID

(75) Inventors: Sumit Bose, Niskayuna, NY (US);
Alfredo Sebastian Achilles, Bavaria (DE); Yan Liu, Ballston Lake, NY (US);
Emad Ezzat Ahmed, Munich (DE);
Luis Jose Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 680 days.

(21) Appl. No.: 11/611,505

(22) Filed: Dec. 15, 2006

(65) Prior Publication Data
US 2008/0143304 A1 Jun. 19, 2008

(51) Int. Cl.
*G05D 11/00* (2006.01)
(52) U.S. Cl. ........................................ 700/297; 700/287
(58) Field of Classification Search .......... 700/286–288, 700/290, 297, 298
See application file for complete search history.

(56) References Cited

U.S. PATENT DOCUMENTS

| | | | | |
|---|---|---|---|---|
| 2003/0011348 | A1* | 1/2003 | Lof et al. | 322/37 |
| 2004/0222642 | A1* | 11/2004 | Siebenthaler et al. | 290/44 |
| 2005/0012339 | A1* | 1/2005 | Mikhail et al. | 290/44 |
| 2005/0040655 | A1* | 2/2005 | Wilkins et al. | 290/44 |

OTHER PUBLICATIONS

Dan Streiffert; "Multi-Area Economic Dispatch with Tie Line Constraints"; IEEE Transactions on Power Systems, vol. 10, No. 4, Nov. 1995; pp. 1946-1951.

Satoshi Fuji, Tetsuo Sasaki, Satoru Ihara, Elizabeth R. Pratico, William W. Price; "Preliminary Design Analysis of Tie-line Bias Control of Reactive Power": Power Engineering Society Winter Meeting, 2002. IEEE; vol. 2 pp. 1258-1263. Available from the Internet <URL: http://ieeexplore.ieee.org/iel5/7733/21229/00985218.pdf>.

Marwali et al.; "Control of Distributed Generation Systems—Part II: Load Sharing Control"; IEEE Transactions on Power Electronics, vol. 19, No. 6, Nov. 2004; pp. 1551-1561.

Matsubara, M. Fujita, G. Shinji, T. Sekine, T. Akisawa, A. Kashiwagi, T. Yokoyama, R.; "Supply and Demand Control of Dispersed Type Power Sources in Micro Grid"; Intelligent Systems Application to Power Systems, 2005. Proceedings of the 13th International Conference on Nov. 6-10, 2005; pp. 67-72.

M.S. Illindala, P. Piagi, H. Zhang, G. Venkatarainanan, R.H. Lasseter; "Hardware Development of a Laboratory-Scale Microgrid Phase 2: Operation and Control of a Two-Inverter Microgrid"; National Renewable Energy Laboratory; Mar. 2004 • NREL/SR-560-35059. (153 pages).

Yan Liu, et al., "Electrical Power Generation System and Method for Generating Electrical Power"; U.S. Appl. No. 11/311,050 filed Dec. 19, 2005.

A.D. Hansen et al., "Centralised power control of wind farm with doubly fed induction generators," Renewable Energy, Pergamon Press, vol. 31, No. 7, Jun. 2006, pp. 935-951.

(Continued)

*Primary Examiner* — Paul L Rodriguez
*Assistant Examiner* — Nathan Laughlin
(74) *Attorney, Agent, or Firm* — Ann M. Agosti

(57) ABSTRACT

A system for controlling a microgrid includes microgrid assets and a tieline for coupling the microgrid to a bulk grid; and a tieline controller coupled to the tieline. At least one of the microgrid assets comprises a different type of asset than another one of the microgrid assets. The tieline controller is configured for providing tieline control signals to adjust active and reactive power in respective microgrid assets in response to commands from the bulk grid operating entity, microgrid system conditions, bulk grid conditions, or combinations thereof.

19 Claims, 7 Drawing Sheets

OTHER PUBLICATIONS

S. Chakraborty et al., "Advanced Active Filtering in a Single Phase High Frequency AC Microgrid," Power Electronics Specialists, 2005 IEEE, 36th Conference on Jun. 12, 2005, pp. 191-197.

G. Celli et al., "Optimal Participation of a Microgrid to the Energy Market with an Intelligent EMS," Power Engineering Conference, Nov. 2005, 7th International Singapore IEEE conference, Nov. 29, 2005, pp. 1-6.

Rodriguez-Amenedo et al., "Operation and coordinated control of fixed and variable speed wind farms," Renewable Energy, Pergamon Press, vol. 33, No. 3, Nov. 29, 2003, pp. 406-414.

Y. Zoka et al., "An interaction problem of distributed generators installed in a Microgrid,"Electric Utility Deregulation, Restructuring and Power Technologies, IEEE International Conference in Hong Kong, Apr. 2004, pp. 795-799.

Lasseter et al., "Integration of distributed energy resources the CERTS MicroGrid Concept," White paper for Electric Reliability Technology solutions, Apr. 2002, pp. 1-27.

EP Search Report, EP07254063, Mar. 10, 2008.

* cited by examiner

SYSTEM AND METHOD FOR CONTROLLING MICROGRID

STATEMENT REGARDING FEDERALLY SPONSORED RESEARCH & DEVELOPMENT

This invention was made with Government support under contract number DE-FC02-05CH11349 awarded by the Department of Energy. The Government has certain rights in the invention.

BACKGROUND

The invention relates generally to microgrids and more particularly to a system and method for controlling microgrids.

A microgrid is defined generally as an aggregation of controllable and uncontrollable assets which may comprise electrical generators, loads, and storage devices, for example. Electrical generators in a microgrid typically include non-conventional energy sources such as micro turbines, wind turbines, photovoltaic systems, fuel cells, or hydrogen fed reciprocating engines, for example. Microgrids may supply power to shopping centers, industrial parks, college campuses or villages, for example.

In order to interconnect a microgrid to a bulk (or main) grid, a utility company will often require the microgrid to maintain the voltage and frequency at the point of interconnection (POI). Traditionally, two methods have been proposed to maintain or regulate the POI voltage and frequency. In one method, static switching capacitors are used. This approach has slow response. Another method is to use static reactive power compensators. This approach has fast response but is expensive. Moreover, these approaches regulate voltage but cannot regulate frequency.

Reactive power control is not presently available for microgrids. Commonly assigned U.S. Pat. No. 6,924,565 describes a windfarm system connected to a utility including a control system which is used to respond to P (active power) and Q (reactive power) commands of a utility and including local controls in each of the wind turbines to implement the commands sent to them. However, in this approach only one type of distributed generator is included (variable speed, equally-sized wind turbines). For microgrid applications with diverse types and sizes of generators, it becomes more important to deal with the various microgrid characteristics, to assist bulk grid operation and improve system performance at the POI, and to minimize microgrid losses.

Tielines may include one or more POIs of a microgrid and a bulk grid. It would be useful to implement an active and reactive power control strategy at tielines of microgrids fed by a wide range of generators.

BRIEF DESCRIPTION

Briefly, in accordance with one embodiment a system for controlling a microgrid is provided. The system includes microgrid assets, at least one of the microgrid assets comprising a different type of asset than another one of the microgrid assets; a tieline for coupling the microgrid to a bulk grid; and a tieline controller coupled to the tieline and configured for providing tieline control signals to adjust active and reactive power in respective microgrid assets in response to commands from a bulk grid operating entity, microgrid system conditions, bulk grid conditions, or combinations thereof.

In another embodiment, a method of controlling a microgrid is provided. The method includes receiving input signals, where input signals comprise internal input signals received from individual assets from microgrid assets, at least one of the microgrid assets comprising a different type of asset than another one of the microgrid assets, and external input signals received from a bulk grid, a bulk grid operating entity, or combinations thereof. The method also includes providing tieline control signals to adjust active and reactive power in respective microgrid assets in response to commands from a bulk grid operating entity, microgrid system conditions, bulk grid conditions, or combinations thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

By controlling the active and reactive power flow through (in and out) a tieline between a microgrid and a bulk grid, the microgrid may both meet point of interconnect (POI) voltage and frequency requirements of the bulk grid and behave as a dispatchable entity to the bulk grid. The system and method described herein enable implementation of the tieline control. The tieline controller described herein may include a flexible design to operate either (1) when the interface power demand is received from the grid operator or (2) as a response to the system conditions such as addition of loads, loss of loads, addition of generation, loss of generation, and degradation of the bulk grid.

Figure 1:
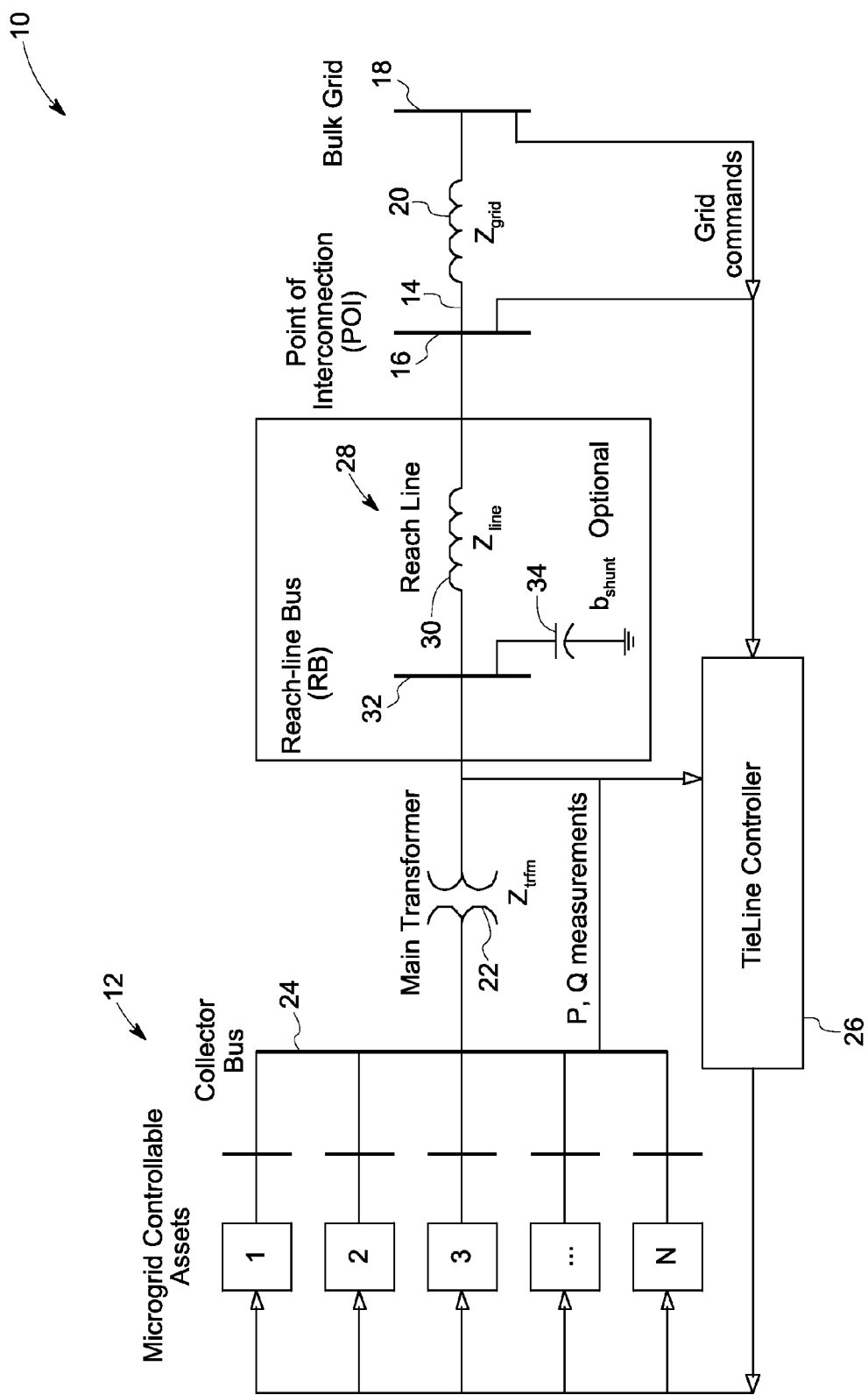
FIG. 1 is a diagrammatic representation of an exemplary system for controlling a microgrid.

FIG. 1 illustrates a system 10 for controlling a microgrid 12. The system 10 includes different types or same types of microgrid assets (shown generally by reference numbers 1, 2, 3, ... N). As used herein "different types" is meant to encompass different categories assets (such as, for renewable energy sources, wind, photovoltaic, or hydro, for example), different classifications of assets (such as, for wind turbine generators, fixed frequency or variable frequency generators), or different sizes of assets (such as 3 MW or 6 MW generators, for example). As used herein "same type" is meant to include assets of equal type and rating. Some examples of the microgrid assets used in system 10 include generators and loads (including thermal loads, for one example), storage components (including thermal storage components, for one example), network components (such as capacitors, cables, and transformers, for example), and renewable energy sources.

The system 10 further includes a tieline 14 for coupling the microgrid 12 at a Point of Interconnect (POI) 16 to a bulk grid 18, represented by an impedance 20 denoted as Zgrid. FIG. 1 also shows a main transformer 22 denoted generally by an optional Ztrfm coupled to a collector bus 24 connecting individual microgrid assets. The transformer 22 is used to step up the collector bus voltage to the grid voltage level or for isolation. The system 10 further includes a tieline controller 26 coupled to the tieline 14 at the POI 16 and configured for providing tieline control signals to adjust active and reactive power in respective microgrid controllable assets in response to commands from a bulk grid 18 operating entity. Such commands are typically sent through an electrical communication interface and may be generated by control systems associated with a particular entity of the bulk grid or may be generated by a human operator associated with the entity, for example. In some embodiments, one of the inputs to the tieline controller 26 is the voltage measurement taken at POI. In some cases, the measurement of the POI voltage is not always feasible due to the long distance between the point of measurement and the POI. This distance is called "reach." In order to accurately control the POI voltage, the "reach" should be taken into account in the controller, usually as a feed-forward term. Therefore, optionally a reach line 28 may also be used to connect the microgrid 12 to the POI 16. Reach line 28 has an impedance Zline denoted generally by reference numeral 30, and may include a reach line bus 32 that is grounded via a capacitance 34, also denoted as bshunt. Although element 16 is labeled as the POI for purposes of illustration, in other embodiments, element 32 is viewed as the point of interconnection. In other words, the POI can be viewed as the direct interconnection point to the bulk grid or as a point along a reach line or other intermediate line between the microgrid and the bulk grid.

In one embodiment, the tieline controller 26 as described herein obtains utility signals (typically P, Q) and then uses two separate modules to generate initial P and Q commands for each of the microgrid assets. The reactive power control module (M-VAR) of the tieline control for microgrid takes the system measurements and the commands from the system operator to provide the reactive power control signals for the microgrid. The active power controller (M-APC) module does the same to generate active power signals. These P and Q commands are then optimized through an optimization routine to generate the final P and Q commands. Finally these P and Q commands are converted to the commands that each asset can accept for its respective internal local controls. The working of the tieline controller 26 is explained in more detail with reference to subsequent figures.

Figure 2:
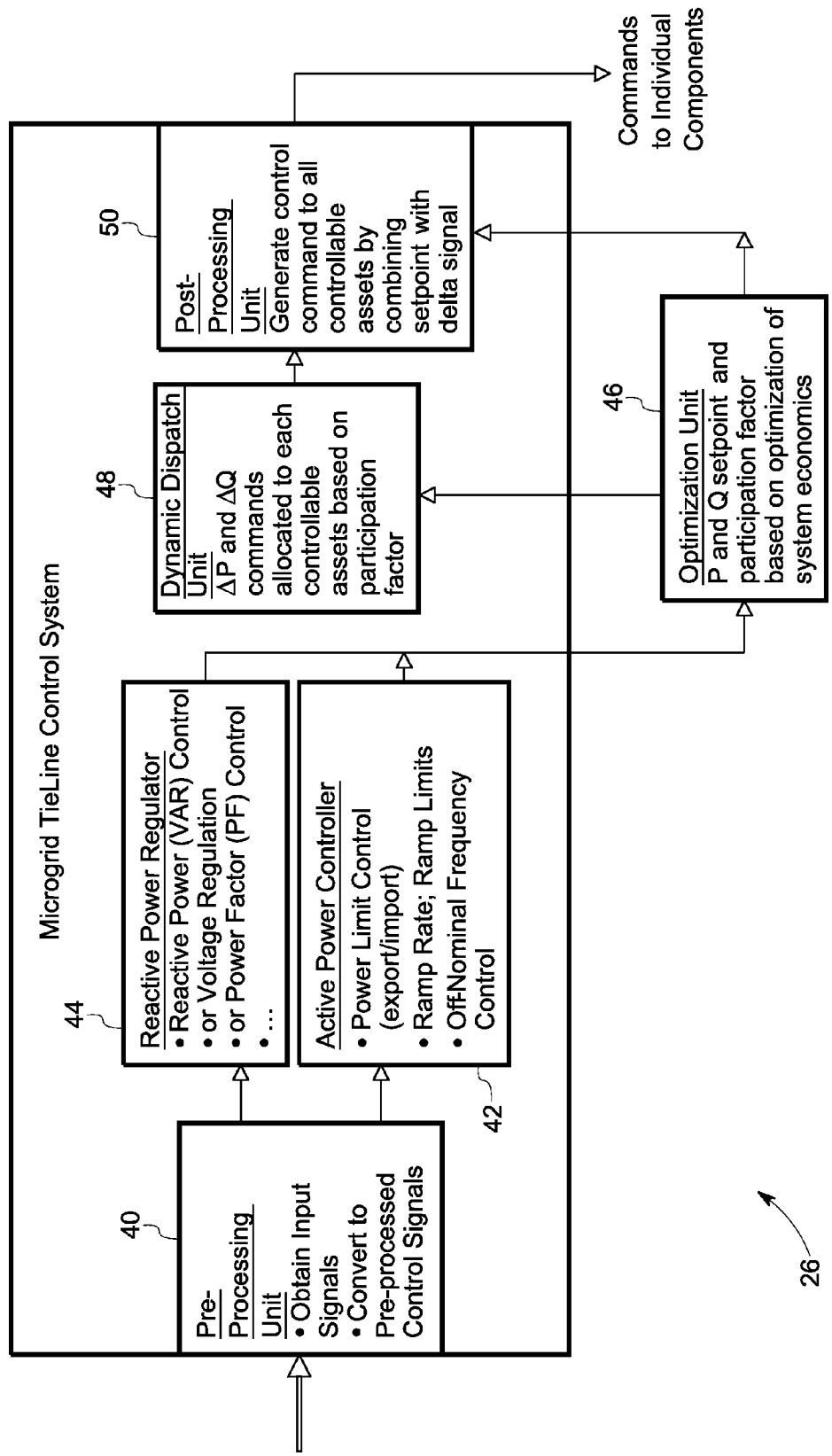
FIG. 2 is a diagrammatic representation of a tieline controller used in the system of FIG. 1.

The tieline controller 26 is shown in more detail in FIG. 2. The tieline controller 26 includes a pre-processing unit 40 configured for receiving input signals and configured for generating pre-processed control signals based on the input signals. The input signals include internal input signals received from individual assets and external input signals received from the bulk grid, a bulk grid operating entity, or combinations thereof. The internal input signals include available power, generated power, power limits, and ratings, for example, obtained with respect to POI and with respect to individual assets. External input signals include external commands from system operators, SCADA (supervisory control and data acquisition), and external controls. External input signals may also include power flow schedule, frequency response control settings, ramp rate limits and power limits, for example. The pre-processing unit 40 interprets all the input signals and converts them to pre-processed control signals that may include signals representative of active power, reactive power, system frequency, and bus voltages, for example.

The tieline controller 26 further includes an active power controller 42 configured for receiving the pre-processed control signals and for generating $\Delta P$ control signals. The $\Delta P$ control signals may correspond to a power limit (export and import), a ramp rate (ramp up and ramp down), a ramp rate limit, a frequency, or combinations thereof, for example.

The tieline controller 26 further includes a reactive power regulator 44 configured for receiving the pre-processed control signals and configured for generating $\Delta Q$ control signals. The $\Delta Q$ control signals may correspond to a reactive power, a voltage regulation, a power factor, or combinations thereof, for example.

The outputs of the active power controller 42 and a reactive power regulator 44 are then typically sent to an optimization unit 46 for finer optimization. The optimization unit 46 is configured for generating an active power setpoint, a reactive power setpoint, and an asset participation factor. A setpoint is the pre-set value of active power and reactive power command to each asset, which will be updated periodically based on overall system optimization. The tieline control will provide fine-tuning to the setpoints. The participation factor is assigned to each controllable asset based on its characteristics and limits. It determines the controllability of the asset when tieline control dispatches the control signals. Any appropriate technique for obtaining such set points or participation factors may be used with several examples being found in Dan Streiffert, "Multi-Area Economic Dispatch with Time Line Constraints," IEEE Transactions on Power Systems, Vol. 10, No. 4, November 1995, pages 1946-1951; Satoshi Fuji et al., "Preliminary Design Analysis of Tie-line Bias Control of Reactive Power," IEEE Power Engineering Society Winter Meeting, Vol. 2, 27-31 Jan. 2002, pages 1258-1263; and Masayoshi Matsubara et al., "Supply and Demand Control of Dispersed Type Power Sources in Micro Grid," Proceedings of the 13th International Conference on Intelligent Systems Application to Power Systems, 6-10 Nov. 2005, pages 67-72.

The tieline controller 26 further includes a dynamic dispatch unit 48 configured for allocating $\Delta P$ commands and $\Delta Q$ commands to individual assets. The dynamic dispatch unit 48 uses the asset participation factor obtained from the optimization unit 46 for allocating the $\Delta P$ commands and $\Delta Q$ commands.

The tieline controller 26 further includes a post-processing unit 50 configured for generating control commands for respective assets by combining, for each asset, a respective active power setpoint, a respective reactive power setpoint, a respective $\Delta P$ command, and a respective $\Delta Q$ command. Thus the control commands to an individual asset may include active and reactive power commands. In a specific example, the tieline controller 26 is configured to issue a total active power command signal to the microgrid based on maximum available power from each individual asset from the microgrid controllable assets. Additionally the tieline controller issues control commands for regulating a voltage and a frequency at the POI as per the requirement by the bulk grid.

Figure 3:
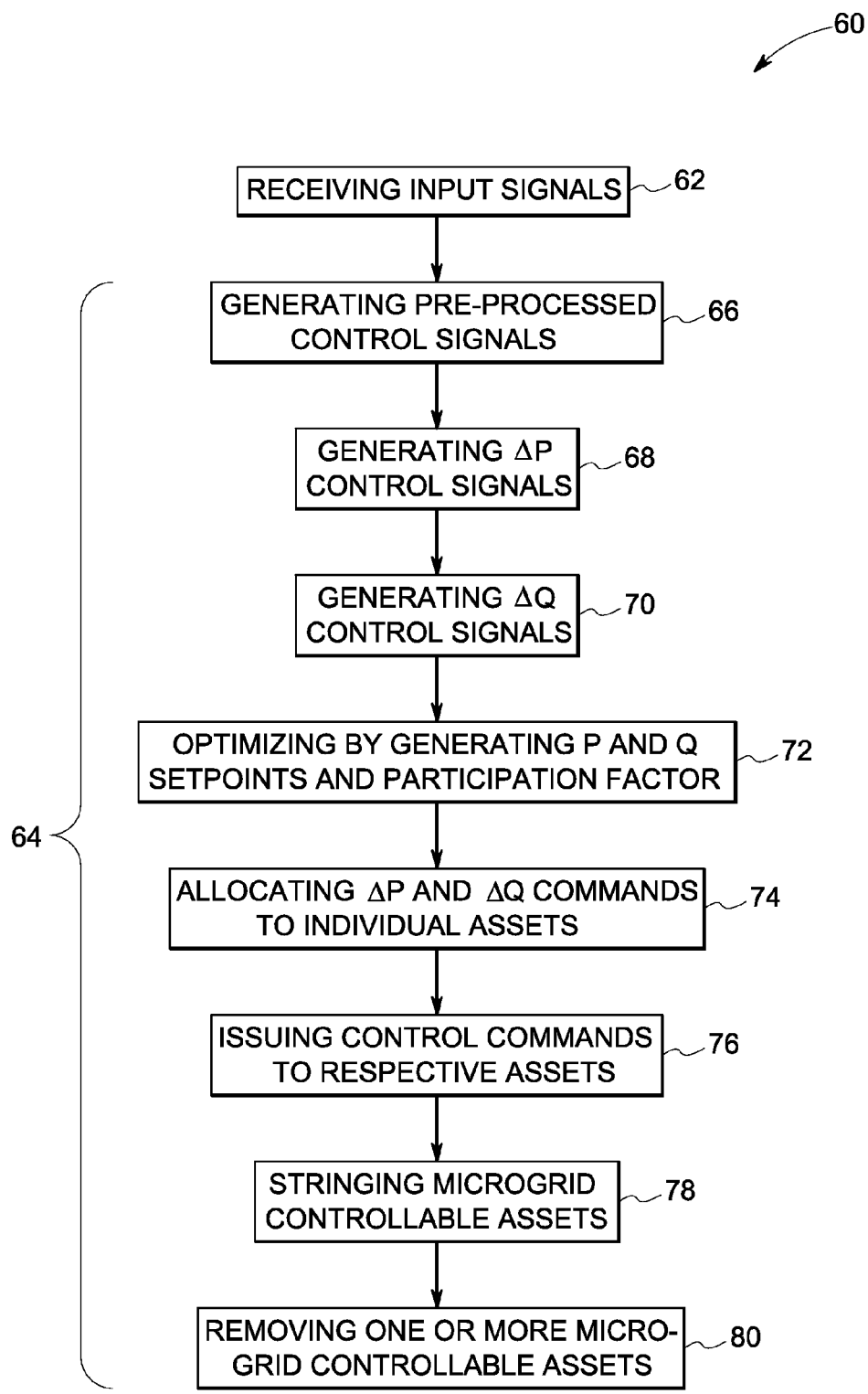
FIG. 3 is a flowchart illustrating exemplary steps for a method for controlling a microgrid.

FIG. 3 is a flowchart 60 summarizing the steps involved in the working of the system described in FIG. 1 and FIG. 2. The method of controlling a microgrid as illustrated in flowchart 60 includes a step 62 of receiving inputs signals, where the input signals include internal input signals received from individual assets from microgrid controllable assets and external input signals received from the bulk grid, a bulk grid operating entity, or combinations thereof and a step 64 configured for providing tieline control signals to adjust active and reactive power in respective microgrid controllable assets in response to commands from the bulk grid operator.

The step 64 further includes the following sub-steps. The sub-step 66 involves generating pre-processed control signals based on the input signals from step 62. Then at sub-step 68, ΔP control signals are generated, where at least one of the ΔP control signals corresponds to a power limit, a ramp rate, a ramp limit, or a frequency. The sub-step 70 involves generating ΔQ control signals, where at least one of the ΔQ control signals corresponds to a reactive power, a voltage regulation, or a power factor. At sub-step 72 several values are generated via optimization, including an active power setpoint, a reactive power setpoint and an asset participation factor. Next at sub-step 74, ΔP commands and ΔQ commands are allocated to individual assets. Finally, at sub-step 76 control commands are issued for respective assets by combining, for each asset, a respective active power setpoint, a respective reactive power setpoint, a respective ΔP command, and a respective ΔQ command. In a specific example, the method includes a step 78 for stringing (adding) microgrid controllable assets together based on the control commands. Similarly the method may also include a step 80 for removing one or more microgrid controllable assets.

Figure 4:
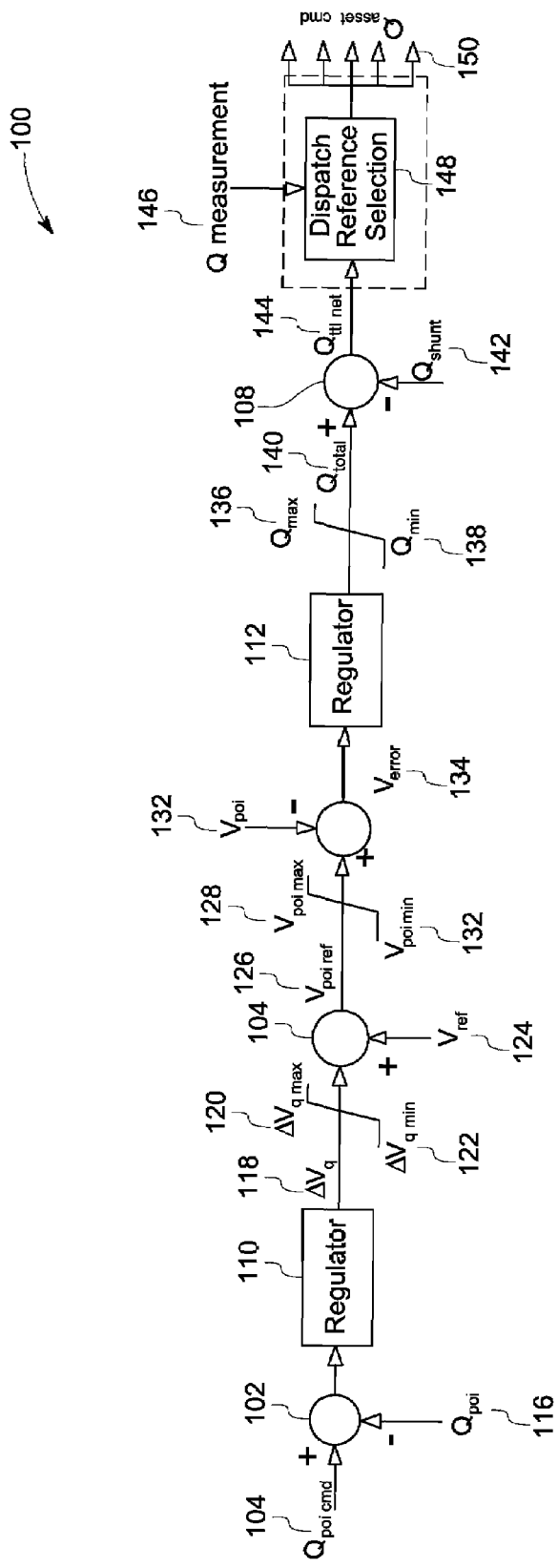
FIG. 4 is a schematic representation of an exemplary embodiment showing reactive power control mode used by the tieline controller of FIG. 2.

FIG. 4 illustrates an exemplary embodiment for the reactive power control (M-VAR) via a reactive power regulator as shown in FIG. 2. FIG. 4 illustrates reactive power regulation mode as an example for tieline reactive power control.

Referring to FIG. 4, the system 100 illustrates a detailed control structure for reactive power control (VAR). In the VAR mode, the error between Qreference and Qmeasurement at POI is regulated by a PI (Proportional and Integral) regulator. By adding desired voltage feed forward a voltage reference is provided to the voltage regulation loop. The total reactive power command is applied to the dispatch reference selection function to generate a reactive power command for each individual available controllable asset. Referring to FIG. 4, the voltage refers to per unit line-to-line voltage and Qttl net refers to the total reactive power 144 command for all the microgrid controllable assets. First, the reach is compensated so that the projected voltage reference Vref, 124 can be obtained (external input from the bulk grid, a bulk grid operating entity, or combinations thereof). On the other side, the difference between the reactive power command from the bulk grid at POI (Qpoi cmd, 114) and the measured reactive power at POI (Qpoi, 116) obtained in the summation block 102 and the output is sent to a voltage regulator 110 to obtain ΔVq, 118 (voltage corresponding to the reactive power) which is limited by a voltage limiter (shown by ΔVqmax, 120 and ΔVqmin, 122) and the output is sent to a summation block 104. The other input to the summation block 104 is the Vref, 124. The output of the summation block 104 is the reference voltage at POI (Vpoi ref), 126. This reference voltage Vpoi ref is then again limited by a voltage limiter (shown by ΔVpoimax, 128 and ΔVpoimin, 130), and the output sent to a summation block 106. The other input to the summation block 106, is Vpoi, 132, that is the measured line to line RMS (root mean square) voltage per unit value. The output of the summation block 106 is the voltage error, Verror 134. The voltage error, Verror 134 is compensated by a voltage regulator 112 and results in a total reactive power command Q total 140 via a reactive power limiter at the output (shown by ΔQmax, 136 and ΔQmin, 138). After subtracting the shunt reactive power Qshunt 142, provided by the shunt capacitors, if any, at the collector bus, in another summation block 108, the adjusted total reactive power command Qttl net 144, for the microgrid is obtained. This adjusted total reactive power command is then dispatched via a Dispatch Reference Selection block 148 to result in reactive power command for individual assets Q asset cmd 150. This command is sent to microgrid assets through SCADA. Q measurement 146 is used to validate the Q dispatch or Q asset cmd 150.

Figure 5:
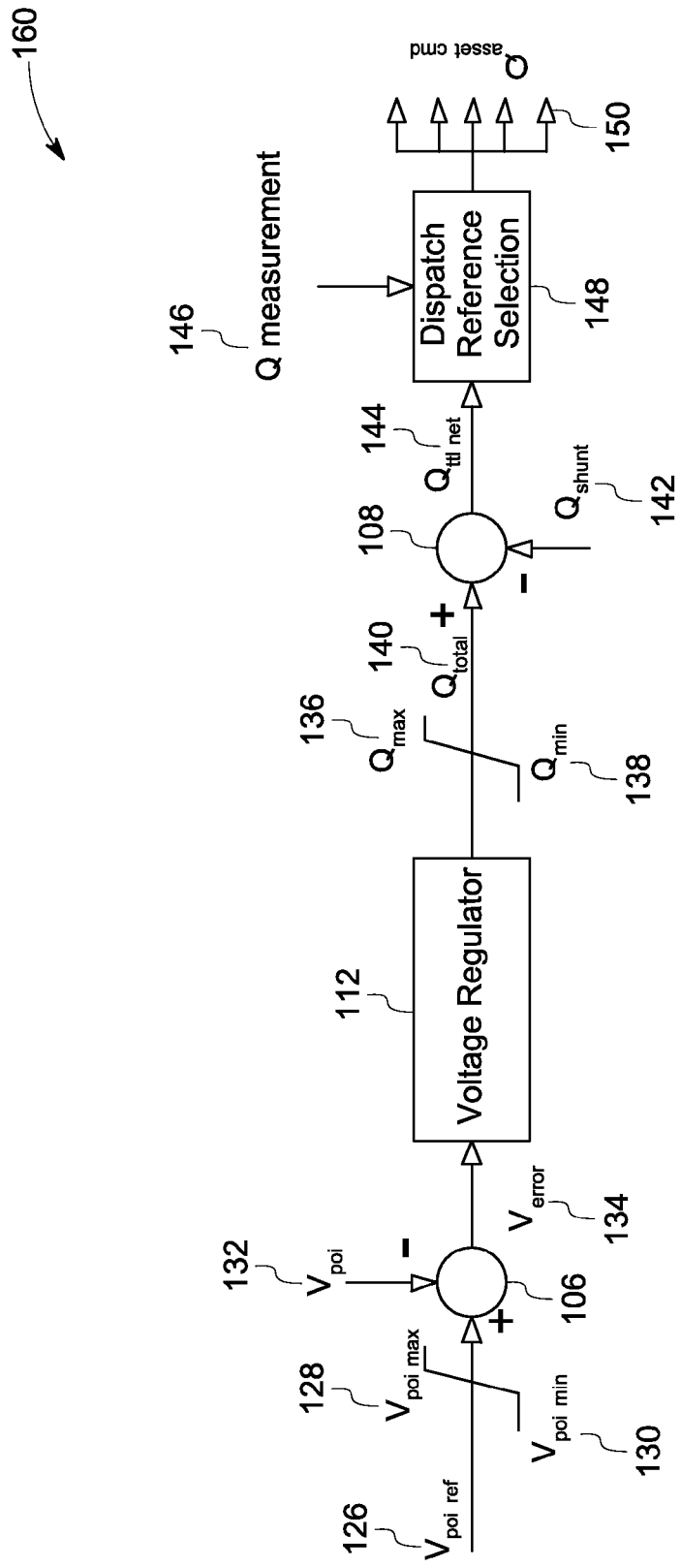
FIG. 5 is a schematic representation of an exemplary embodiment showing voltage regulation mode used by the tieline controller of FIG. 2.
Figure 6:
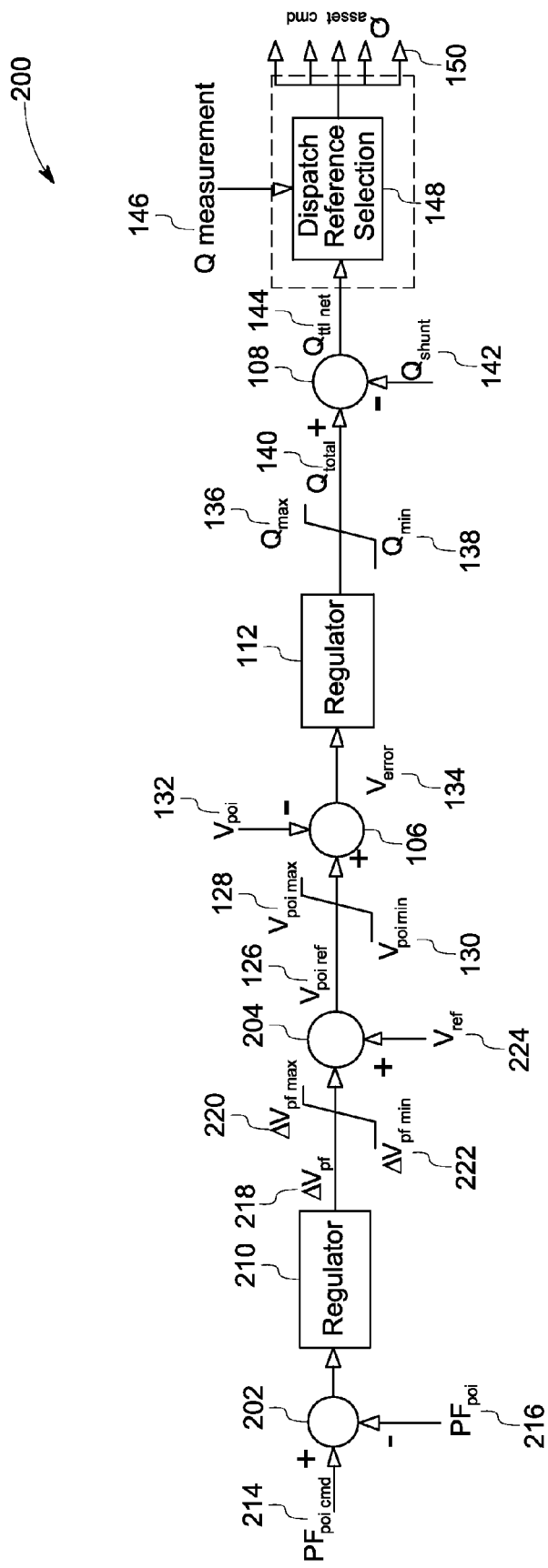
FIG. 6 is a schematic representation of an exemplary embodiment showing power factor control mode used by the tieline controller of FIG. 2.

Similar to the reactive power control mode described in reference to FIG. 4, the voltage regulation mode and power factor modes may also be implemented. FIG. 5 is a schematic representation of a voltage regulation mode and FIG. 6 is a schematic representation of a power factor (PF) regulation mode. The control elements shown in FIG. 5 are similar to the ones shown in FIG. 4. Instead of the Q command, in voltage regulation mode, measured voltage at POI (Vpoi) and reference voltage (Vpoi ref) at POI is used as the input.

Similarly, in a power factor regulation mode of the M-VAR control, as shown in FIG. 6, instead of a voltage command, the operator issues a reference power factor command (external input signal, PFpoi cmd, 214). The measurement of power factor (PFpoi, 216) is normally not readily available. The voltage and current measurement are therefore used to calculate the measurement of power factor. Line drop compensation is done in the case with reach line. The reference power factor is compared with the calculated and compensated power factor in the block 202. The error passes through a power factor regulator controller 210 (as an implementation of the reactive power regulator) to provide the projected voltage reference at POI (Vpoi ref, 126) via a limiter ΔVpf max, 220 and ΔVpf min, 222 that uses ΔVpf, 218 from the output of regulator 210. Then the reactive power command is generated from the error of the voltage reference and the voltage measurement as addressed in the embodiment of FIG. 4. The other control elements shown in FIG. 6 are similar to the ones shown in FIG. 4.

Figure 7:
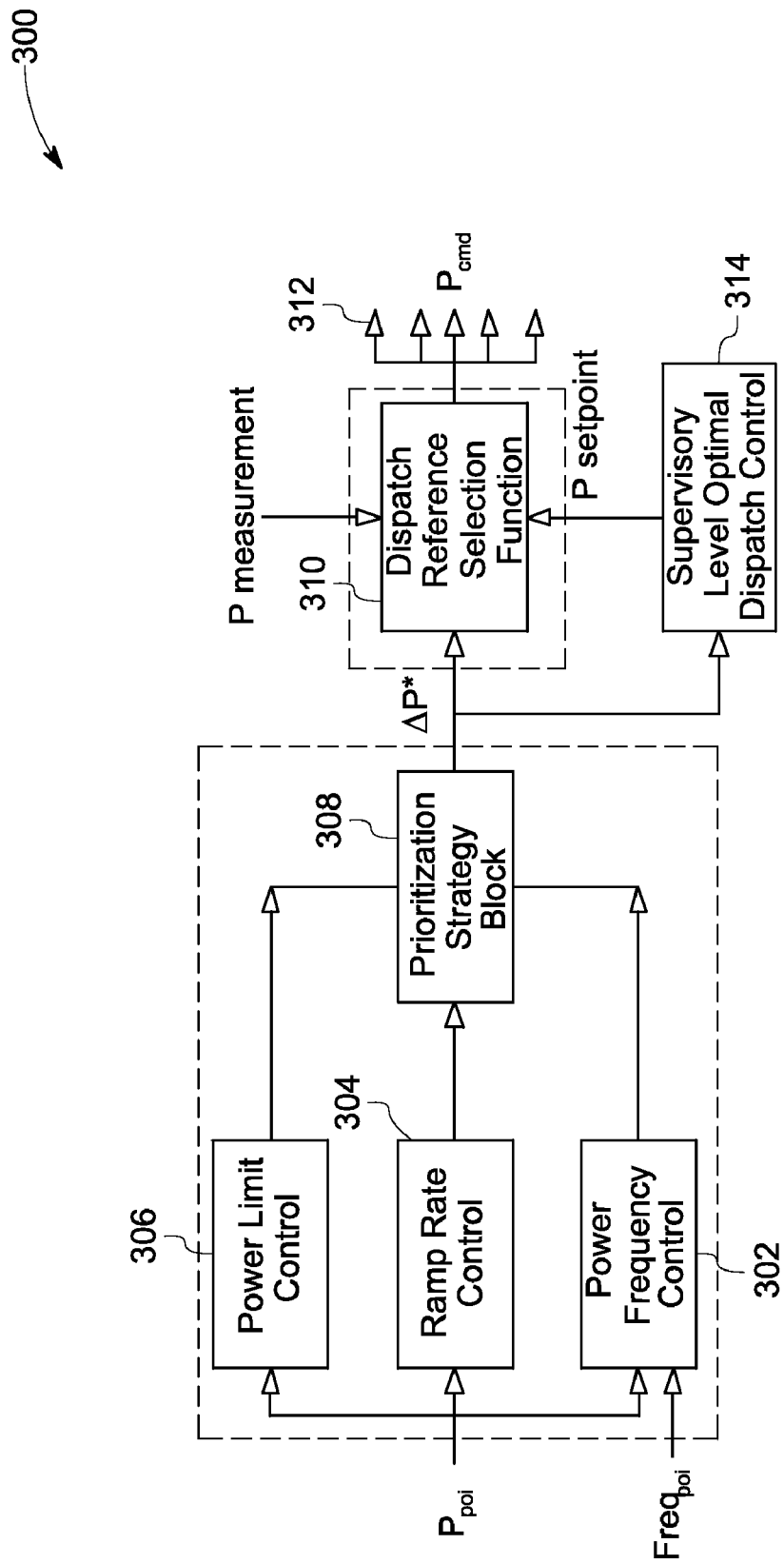
FIG. 7 is a schematic representation of an exemplary embodiment showing an active power control used by the tieline controller of FIG. 2.

FIG. 7 illustrates an embodiment of an active power control scheme 300 used by the active power controller as shown in FIG. 2. The active power control is used for three specific functions: to enforce the power limit at the POI, to enforce the ramp rate limit at POI, and to respond to system frequency excursions. FIG. 7 shows three parallel control loops: power frequency control as denoted by reference numeral 302, ramp rate control as denoted by reference numeral 304, and power limit control as denoted by reference numeral 306. These three parallel control loops for power limit, ramp rate limit, and power frequency limit are not activated if all the operation conditions are within the system limits. However, if any one of the controls is triggered, an adjustment command ΔP is generated in order to bring the system back to the normal operating conditions. A priority is given via the prioritization strategy block 308, to each control loop, with power limit control having the highest priority and ramp rate limit control having the lowest priority, in an exemplary embodiment. The priority is given based on the specific applications and can be customized.

The total adjustment command ΔP* is then sent to a Dispatch Reference Selection Function, denoted generally by reference numeral 310. The Dispatch Reference Selection Function 310, dispatches the Pcmd or active power command among the available assets 312. The Pcmd is based on the participation factor of the assets assigned by a Supervisory Level Optimal Dispatch Control 314. The individual adjustment for each asset is added to the power set point shown as Psetpoint, also obtained from the Supervisory Level Optimal Dispatch Control, to provide the final command to the controllable assets.

The system and method discussed herein offer several advantages. For example, the system may be used to regulate voltage at a point of interconnection, regulate bulk grid frequency, or both. More specific advantages include capability of controlling the microgrid as a unity entity to respond to the bulk grid reactive power command. The system can advantageously maintain the voltage stability of the tieline, and contribute to the bulk grid stability. The system also considers the reach line drop and compensates for it. The system can respond to the changes in reactive power, power factor, and voltage command. The system can issue a total reactive power command to the post optimization and dispatching control. It can also issue commands to individual assets in microgrid directly by reactive power dispatch means using the power limit, rating and other constraints and criteria.

The system provides the controllability of the active power flow at the POI with respect to the bulk grid. The tieline controller issues total active power command to microgrid as described in reference to FIG. 2 which is limited by the maximum available power form the individual assets (for example distributed generator units). For example, the tieline controller can enforce a maximum power output from the renewable energy generators and can deal with the situation of a randomly variable wind speed conditions through a power dispatch function to set the power order for each asset accordingly. The tieline controller, thus considers the maximum power that can be obtained from each asset and can limit the ramp rate of the microgrid total power command and also the ramp rate of the power generated from each asset. This can help avoid overloading the utility electrical equipment at the POI. The power at the POI is thus controlled to comply with potential utility requirements and to avoid undesirable system dynamic behavior. Moreover, the microgrid can be dispatched by the utility at will, and provide maximum flexibility to the utility.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for controlling a microgrid, the system comprising:
   microgrid assets, at least one of the microgrid assets comprising a different type of electrical generator than an electrical generator of another one of the microgrid assets;
   a tieline for coupling the microgrid to a bulk grid; and
   a tieline controller coupled to the tieline and configured for providing tieline control signals to adjust active and reactive power in respective microgrid assets in response to commands from the bulk grid operating entity, microgrid system conditions and bulk grid conditions,
   wherein the tieline controller comprises an active power controller configured for generating a plurality of prioritized $\Delta P$ control signals, wherein at least one of the plurality of prioritized $\Delta P$ control signals corresponds to a power limit, a ramp rate, a ramp rate limit, or a frequency.

2. The system of claim 1 wherein the microgrid assets further comprise loads.

3. The system of claim 1 wherein the microgrid assets further comprise at least one storage or network component.

4. The system of claim 1 wherein the electrical generators comprise at least one renewable energy source.

5. The system of claim 4 wherein the electrical generators comprise two different types of renewable energy sources.

6. The system of claim 1 wherein the microgrid assets further comprise at least one thermal load or storage component.

7. The system of claim 1 wherein the tieline controller further comprises:
   a pre-processing unit configured for receiving input signals and configured for generating pre-processed control signals based on the input signals, wherein the input signals comprise internal input signals received from individual assets from the microgrid assets and external input signals received from the bulk grid, a bulk grid operating entity, or combinations thereof.

8. The system of claim 7 wherein active power controller is configured for receiving the pre-processed control signals for use in generating the plurality of prioritized $\Delta P$ control signals.

9. The system of claim 8 wherein the tieline controller further comprises:
   a reactive power regulator configured for generating a plurality of $\Delta Q$ control signals, wherein at least one of the plurality of $\Delta Q$ control signals corresponds to a reactive power regulation, a voltage regulation, or a power factor regulation.

10. The system of claim 1 wherein the tieline controller is configured to regulate voltage at a point of interconnection.

11. The system of claim 1 wherein the tieline controller is configured to regulate bulk grid frequency.

12. The system of claim 1 wherein the tieline controller is configured to issue a total active power command signal to the microgrid based on maximum available power from each individual asset from the microgrid assets.

13. A method of controlling a microgrid, the method comprising:
   receiving a plurality of input signals, wherein the plurality of input signals comprise a plurality of internal input signals received from individual assets from microgrid assets and a plurality of external input signals received from the bulk grid, a bulk grid operating entity, or combinations thereof, wherein at least one of the microgrid assets comprises an electrical generator of a different type than an electrical generator of another one of the microgrid assets; and
   providing tieline control signals to adjust active and reactive power in respective microgrid assets in response to commands from the bulk grid operating entity, microgrid system conditions and bulk grid conditions,
   wherein providing tieline control signals to adjust active power comprises generating a plurality of prioritized $\Delta P$ control signals, wherein at least one of the plurality of prioritized $\Delta P$ control signals corresponds to a power limit, a ramp rate, a ramp rate limit, or a frequency.

14. The method of claim 13 wherein providing tieline control signals comprises generating pre-processed control signals based on the plurality of input signals.

15. The method of claim 14 wherein providing tieline control signals further comprises generating a plurality of $\Delta Q$ control signals, wherein at least one of the plurality of $\Delta Q$ control signals corresponds to a reactive power regulation, a voltage regulation, a power factor regulation or a combination thereof.

16. The method of claim 13 wherein the tieline controller is configured to regulate voltage at a point of interconnection.

17. The method of claim 13 wherein the tieline controller is configured to regulate bulk grid frequency.

18. The method of claim 13 wherein the tieline controller is configured to issue a total active power command signal to the microgrid based on maximum available power from each individual asset from the microgrid assets.

19. A system for controlling a microgrid, the system comprising:
- microgrid assets, at least one of the microgrid assets comprising a different type of electrical generator than an electrical generator of another one of the microgrid assets;
- a tieline for coupling the microgrid to a bulk grid; and
- a tieline controller coupled to the tieline and configured for providing tieline control signals to adjust active and reactive power in respective microgrid assets in response to commands from the bulk grid operating entity, microgrid system conditions, and bulk grid conditions, wherein the tieline controller comprises:
  - an active power controller configured for generating a plurality of prioritized $\Delta P$ control signals, wherein at least one of the plurality of prioritized $\Delta P$ control signals corresponds to a power limit, a ramp rate, a ramp rate limit, or a frequency,
  - a reactive power regulator configured for generating a plurality of $\Delta Q$ control signals, wherein at least one of the plurality of $\Delta Q$ control signals corresponds to a reactive power regulation, a voltage regulation, or a power factor regulation, and
  - a dispatch reference selection function for using a participation factor of individual ones of the microgrid assets to provide individual adjustment factors for the microgrid assets for use in generating the tieline control signals.

* * * * *